United States Patent
Pekonen et al.

(10) Patent No.: US 7,747,930 B2
(45) Date of Patent: Jun. 29, 2010

(54) METHOD AND SYSTEM FOR FORWARD ERROR CORRECTION

(75) Inventors: Harri Pekonen, Raisio (FI); Matti Puputti, Turku (FI); Dominique Müller, Dachsen (CH); András Borsos, Helsinki (FI); Jussi Vesma, Turku (FI)

(73) Assignee: Nokia Coprporation, Espoo (FI)

( * ) Notice: Subject to any disclaimer, the term of this patent is extended or adjusted under 35 U.S.C. 154(b) by 1085 days.

(21) Appl. No.: 10/547,820

(22) PCT Filed: Mar. 5, 2004

(86) PCT No.: PCT/IB2004/050204

§ 371 (c)(1),
(2), (4) Date: May 8, 2006

(87) PCT Pub. No.: WO2004/079982

PCT Pub. Date: Sep. 16, 2004

(65) Prior Publication Data

US 2007/0038921 A1    Feb. 15, 2007

(30) Foreign Application Priority Data

Mar. 18, 2003 (GB) ................ 0306220.5
Apr. 22, 2003 (GB) ................ 0309093.3
Apr. 23, 2003 (GB) ................ 0309234.3

(51) Int. Cl.
    *H03M 13/00* (2006.01)
(52) U.S. Cl. ............ 714/784; 370/474; 714/746
(58) Field of Classification Search ........ 714/752, 714/784, 746; 370/395.5, 746
See application file for complete search history.

(56) References Cited

U.S. PATENT DOCUMENTS

| 5,159,452 | A  | 10/1992 | Kinoshita et al. ........... 358/141 |
| 5,642,365 | A  | 6/1997  | Murakami et al. ......... 371/38.1 |
| 6,369,855 | B1 | 4/2002  | Chauvel et al. |
| 6,453,112 | B2 | 9/2002  | Imahashi et al. |
| 6,466,624 | B1 | 10/2002 | Fogg |
| 6,516,435 | B1 | 2/2003  | Tsunoda |
| 6,529,550 | B2 | 3/2003  | Tahara et al. |
| 6,573,907 | B1 | 6/2003  | Madrane |

FOREIGN PATENT DOCUMENTS

| JP | 11-136220   | 5/1999 |
| WO | WO 00/36755 | 6/2000 |

OTHER PUBLICATIONS

ATM Forum, Draft Proposal for specification of FEC-SSCS for AAL type 5, Oct. 2-6, 1995.*
Carle et al. A cell-level forward error correction scheme (FEC-SSCS) for ATM netwrok. Oct. 1997.*
Patent Abstracts of Japan, Publication No. 11-136220, Date of Publication: May 21, 1999 (one page).

* cited by examiner

*Primary Examiner*—Sam Rizk

(57) ABSTRACT

Systems and methods wherein a two-dimensional array or the like is employable in data transmission and/or reception, and wherein characteristic values are computable with respect to data to be transmitted. The characteristic values are transmitted along with the data and perhaps used by a data recipient, and could include, for instance, forward error correction data. Various such systems and methods are employable for a number of network types including, for example, Digital Video Broadcast networks.

69 Claims, 11 Drawing Sheets

Fig. 9
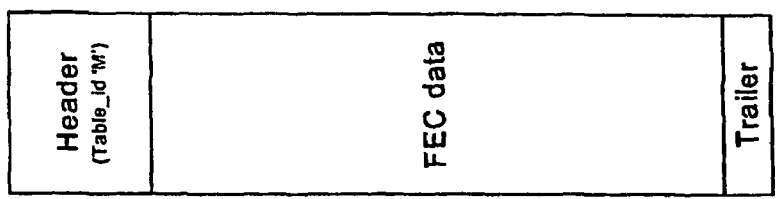
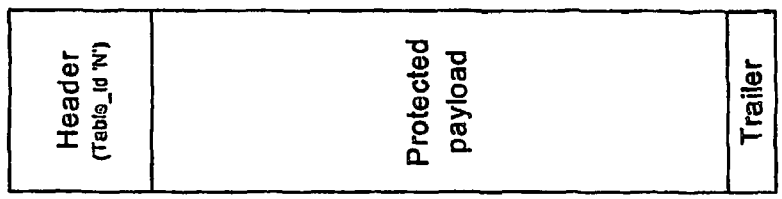
Both use same private section format defined in ISO 13818-1

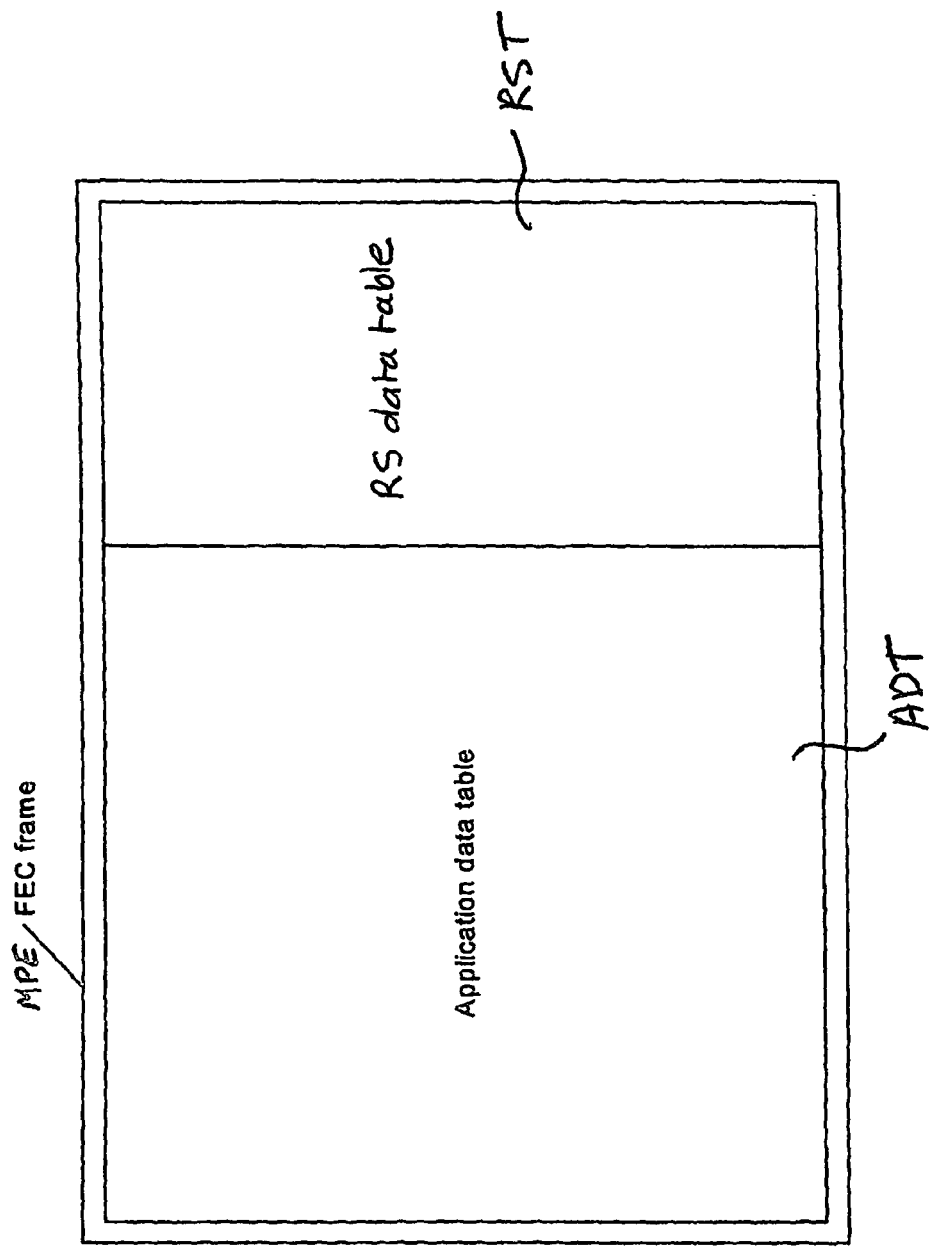

FIG. 11

| MPE Section Syntax | FEC Section Syntax | Bits | Mnemonic |
|---|---|---|---|
| datagram_section(){ | datagram_section(){ | | |
| table_id | table_id | 8 | uimsbf |
| section_syntax_indicator | section_syntax_indicator | 1 | bslbf |
| private_indicator | private_indicator | 1 | bslbf |
| reserved | reserved | 2 | bslbf |
| section_length | section_length | 12 | uimsbf |
| MAC_address_6 | unused | 8 | uimsbf |
| MAC_address_5 | MAC_address_5 | 8 | uimsbf |
| reserved | reserved | 2 | bslbf |
| payload_scrambling_control | | | bslbf |
| address_scrambling_control | | | bslbf |
| LLC_SNAP_flag | unused | 5 | bslbf |
| current_next_indicator | current_next_indicator | 1 | bslbf |
| section_number | section_number | 8 | uimsbf |
| last_section_number | last_section_number | 8 | uimsbf |
| MAC_address_4 | MAC_address_4 | 8 | uimsbf |
| MAC_address_3 | MAC_address_3 | 8 | uimsbf |
| MAC_address_2 | MAC_address_2 | 8 | uimsbf |
| MAC_address_1 | MAC_address_1 | 8 | uimsbf |
| if (LLC_SNAP == '1') { | | | |
| LLC_SNAP() | | | |
| } else { | | | |
| for (i=0; i<N1; i++) { | for (i=0; i<N1; i++) { | | |
| IP_datagram_byte | RS_FEC_byte | 8 | bslbf |
| } | } | | |
| } | | | |
| if (section_number == last_section_number) { | if (section_number == last_section_number) { | | |
| for (i=0; i<N2; i++) { | for (i=0; i<N2; i++) { | | |
| stuffing_byte | stuffing_byte | 8 | bslbf |
| } | } | | |
| } | | | |
| if (section_syntax_indicator == "0") { | if (section_syntax_indicator == "0") { | | |
| checksum | checksum | 32 | uimsbf |
| } else { | } else { | | |
| CRC_32 | CRC_32 | 32 | rpchof |
| } | } | | |
| } | } | | |

METHOD AND SYSTEM FOR FORWARD ERROR CORRECTION

CROSS-REFERENCE TO RELATED APPLICATIONS

This application is the U.S. National Stage of International application number PCT/IB2004/050204 filed Mar. 5, 2004 and published in English on Sep. 16, 2004 under publication number WO 2004/079982 A1, and claiming priority from U.S. patent application Ser. No. 10/382,334 filed Mar. 5, 2003; Great Britain patent application number 0306220 filed Mar. 18, 2003; Great Britain patent application number 0309093 filed Apr. 22, 2003; International patent application number PCT/US03/12682 filed Apr. 23, 2003; and Great Britain patent application number 0309234 filed Apr. 23, 2003.

FIELD OF INVENTION

This invention relates to systems and methods for data transmission and reception.

BACKGROUND INFORMATION

Services used in mobile handheld terminals require relatively low bandwidth. The estimated maximum bitrate for streaming video using advanced compression like MPEG-4 is in the order of few hundred kilobits per second, one practical limit being 384 kbps coming from the 3G environment. Some other types of services, as file downloading, may require significantly higher bandwidth, though. Therefore we have requirement for flexibility.

A DVB transmission system usually provides bandwidth of 10 Mbps or more. This provides a possibility to significantly reduce the average DVB receiver power consumption by introducing a schema based on time division multiplexing (TDM). The introduced schema is called time slicing.

The idea of time slicing is to send data in bursts using significantly higher bandwidth compared to the bandwidth required if the data was transmitted using static bandwidth. Within a burst, time to the beginning of the next burst (delta-t) is indicated. Between the bursts, data of the service is not transmitted, allowing other services to use the bandwidth otherwise allocated for the service. This enables a receiver to stay active only a fragment of the time, while receiving bursts of a requested service. If the mobile handheld terminal requires a constant lower bitrate, buffering the received bursts may provide this.

As an extra benefit, time slicing also supports the possibility to use the receiver to monitor neighboring cells during the off-times. And by accomplishing the switching of the reception from transport stream to another during an off period, the reception of a service is seemingly uninterrupted. In a normal DVB-T system a smooth hand-over would require two front-ends in a single terminal.

The data is formatted by using, for example, a multi-protocol encapsulator in accordance with Section 7 of European Standard EN 301 192 "Digital Video Broadcasting (DVB); DVB specification for data broadcasting." The multi-protocol encapsulator sends encapsulated data to a digital broadcast transmitter for broadcast to the digital broadcast receiver as a time-slicing signal. The time-slicing signal comprises a continuous series of transmission bursts.

It is noted that further information regarding DVB may be found, for example, in the following ETSI (European Telecommunications Standards Institute) documents, each of which is incorporated herein by reference:

ETSI TR 101202 Digital Video Broadcasting (DVB) "Implementation guidelines for Data Broadcasting"

ETSI EN 300468 Digital Video Broadcasting (DVB) "Specification for Service Information (SI) in DVB systems"

ETSI EN 300 744 "Digital Video Broadcasting (DVB) Framing structure, channel coding and modulation for digital terrestrial television"

In recent years, there has been an increase in the use of the use of wired and wireless networks for various purposes. For example, networks are increasingly used for the transmission and reception of, for example, media, applications, and personal communications. In view, for example, of this increased use, there may be interest in technologies applicable to such networks. Usually the transmission and reception of data may cause some quality problems and therefore different kinds of error correction schemas may exist. Especially when a mobile terminal is in question there is a need to utilize different information in error correction data and data to be corrected.

SUMMARY OF THE INVENTION

According to the invention there is provided a method for data transmission, comprising:

placing one or more data segments into a two-dimensional data structure having first directional arrangements and second directional arrangements, wherein said first directional arrangements are perpendicular to said second directional arrangements, and wherein placement is with respect to said first directional arrangements; adding to each of said second directional arrangements one or more corresponding computed characteristic values; transmitting the contents of one or more of said first directional arrangements that holds portions of said characteristic values; and transmitting said one or more data segments, wherein data segments placed into said two-dimensional structure are transmitted according to a first specific format and said first directional arrangements holding portions of said characteristic values are transmitted with a second specific format in the transport stream.

The transmitting according to first specific format may comprise encapsulating data segments placed into said two-dimensional structure into one or more data packets having a first header and the transmitting according to second specific format may comprise encapsulating data in each first directional arrangements that holds portions of said characteristic values into a data packet having a second header.

Each packet header may include data structure placement information and/or data indicating data segment boundaries.

The encapsulated contents of one or more of said first directional arrangements holding portions of said characteristic values may be transmitted in a different burst from said encapsulated data segments.

According to the present invention there is also provided a transmitter node configured to perform the method.

According to the present invention there is further provided a method of receiving data comprising: receiving one or more data segments in a transport stream, providing a two-dimensional data structure having first directional arrangements and second directional arrangements, wherein said first directional arrangements are functionally perpendicular to said second directional arrangements, and wherein placement of said data segments is with respect to said first directional arrangements; wherein data segments placed into said two-dimensional structure are received according to a first specific format; said first directional arrangements also receiving portions of characteristic values that are received with a second specific format in the transport stream, and processing the data segments with respect to the second directional arrangements using the received characteristic values to provide corrected data segments with respect to the first directional arrangements.

According to the present invention there is still further provided a receiver node to perform the method of receiving data. Further features and advantages of the invention will be apparent from the claims hereinafter.

BRIEF DESCRIPTION OF THE DRAWINGS

In order that the invention may be more fully understood, embodiments thereof will now be described by way of example with reference to the accompanying drawings in which:

FIG. 9 shows a diagram of header section format of MPE-FEC and MPE section.

FIG. 10 shows a MPE-FEC Frame structure of an embodiment of the invention.

FIG. 11 shows a Table showing a description of MPE and MPE-FEC section syntaxes.

DETAILED DESCRIPTION

Figure 1:
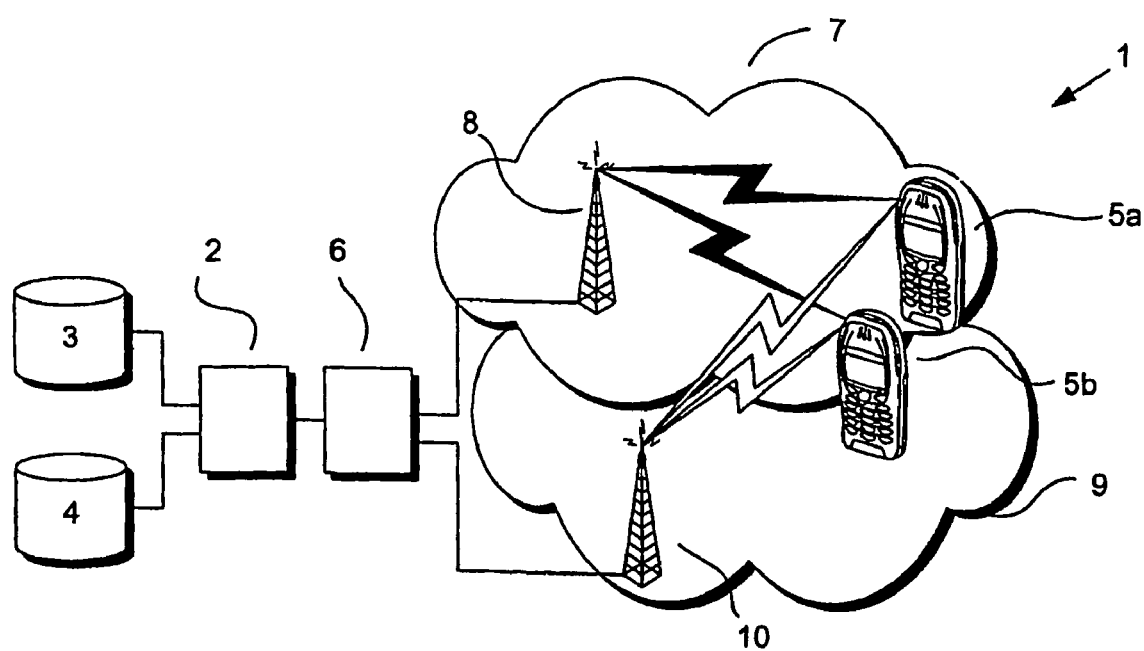
FIG. 1 shows a communication system according to a first embodiment of the invention.

FIG. 1 is a block diagram of a communication system 1 according to a first embodiment of the invention. The communication system comprises a content provider 2 that has access to sources 3, 4 of content, such as audio-visual content, data files or images. The content may be transmitted using IP over digital broadband network, like DVB-T network, in what is known as an IP Datacasting (IPDC) service, to one ox more receiving devices 5a, 5b. The receiving devices 5a, 5b, e.g. mobile telephones with video capabilities, are configured to receive data from at least two different communication channels.

The content data is transmitted to a network element 6, which is a server configured to receive the content data and to generate recovery data for use in forward error correction of the content data. The content data is transmitted to the receiving devices 5a, 5b via a first channel. In this example, the first communication channel is provided by a Digital Broadcasting (like DVB-T) network 7, which includes a transmitter 8. The content is broadcast multicast or unicast to all suitable receiving devices 5a, 5b within a cell associated with the first communication network 7.

The recovery data is transmitted to the receiving devices 5a, 5b via a second communication channel provided e.g. by a Third Generation (3G) mobile network 9, which includes at least a transmitter 10.

It should be noted that the communication paths for the content and recovery data are shown in FIG. 1 in a simplified form. However, other elements such as further transmitters, network elements or networks may be situated in these communication paths. It will be understood that the network shown in FIG. 1 provides a transmitter node for transmitting data to the receivers 5a 5b, which constitute receiver or recipient nodes, and such terms will be used in the description hereinafter.

General Operation

There are provided, according to various embodiments of the present invention, systems and methods for data transmission and reception. According to various exemplary embodiments, a two-dimensional array or the like of addressable storage locations could be created and/or accessed by a transmitting node.

Figure 2:
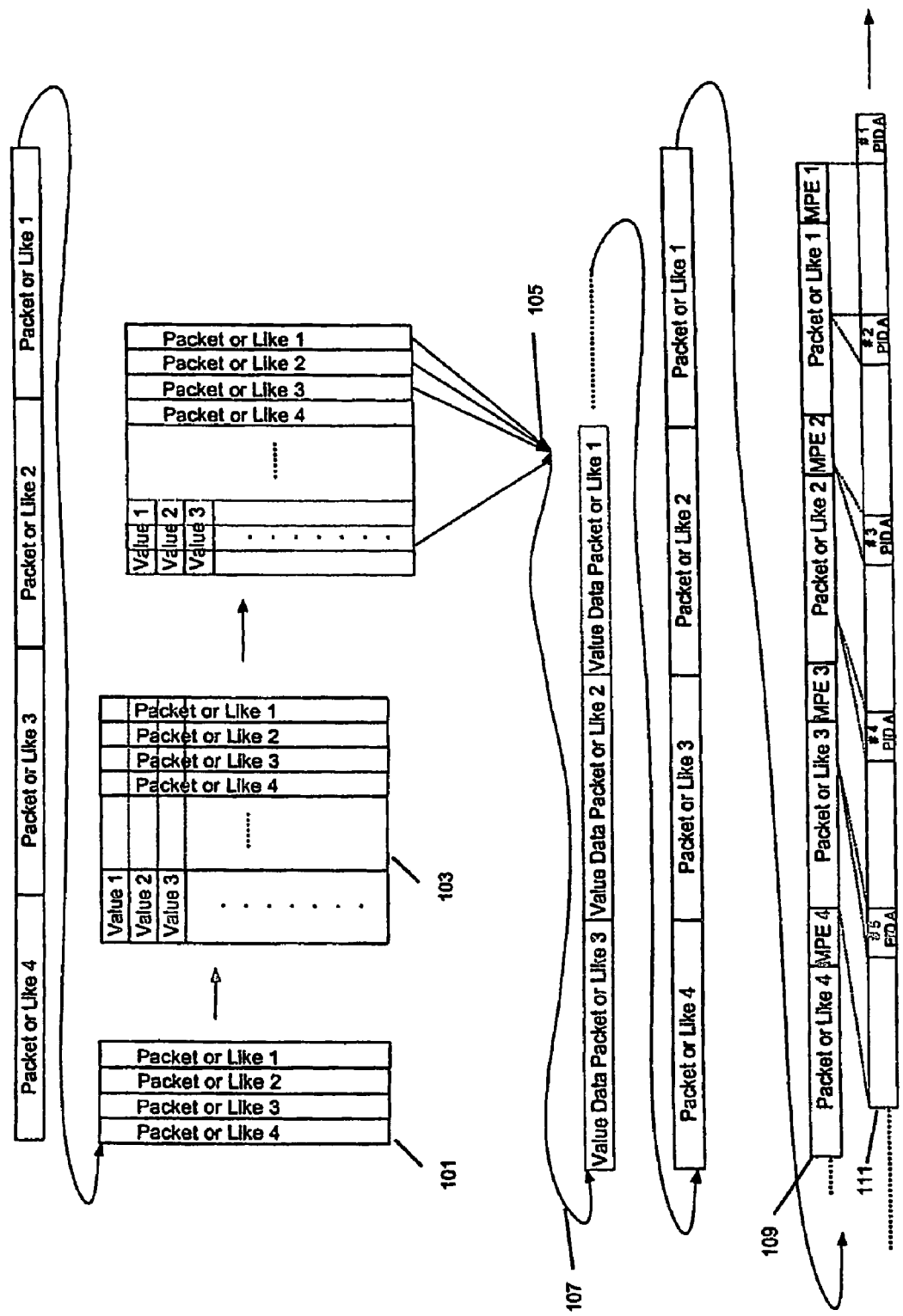
FIG. 2 is a diagram depicting exemplary steps involved in data transmission according to embodiments of the present invention.

Turning to FIG. 2, it is noted that in such embodiments, packets or the like corresponding to data to be transmitted by the node, perhaps in a particular burst, could be loaded into the two-dimensional array or the like in a columnar-wise manner (step 101). Such packets or the like might be, for instance, Internet Protocol (IP) packets. Accordingly, the contents of a loaded packet or the like could occupy one or more addressable storage locations of one or more columns.

Next, one or more characteristic values could be computed with respect to each row of the two-dimensional array or the like (step 103). Such characteristic values might, for example, express forward error correction (FEC) data. As a specific example, such FEC data might be Reed-Solomon (RS) error correction data. A computed characteristic value corresponding to a row could next be written as FEC data. Accordingly, the characteristic value could occupy one or more addressable storage locations of that row.

It is noted that, in various embodiments, the manner in which characteristic values were computed could vary dynamically. Asa specific example, where characteristic values corresponded to FEC data (e. g. , Reed-Solomon data), the amount of parity data to be added could vary dynamically. For instance, more parity data could be added where network conditions arose that were expected to result in greater transmission error. Further the quality of transmission may be evaluated and a decision of error correction can be defined.

As a next step, the two-dimensional array or the like is emptied in a columnar-wise manner (step 105). In such emptying, the originally loaded packets or the like could be extracted. In various embodiments, each originally loaded packet might be modified by the node so as to include an indication of where it was stored in the array or the like. The indication might, for instance, state the row and/or column address corresponding to the first addressable storage location that was occupied by the packet or the like.

Such an indication might, for instance, be stored in a header corresponding to the packet or the like. The indication corresponding to a packet or the like might, for example, be added to that packet or the like by the node soon after the node placed it in the array or the like. As another example, the node might place the indication soon before unloading the packet from the array or the like.

Further in the columnar-wise emptying, data corresponding to computed characteristic values are unloaded and placed into one or more packets or the like (step 107). The one or more packets or the like could, for example, be IP packets.

Such a packet could, for example, contain all of the data corresponding to computed characteristic values stored in a particular column of the array or the like. Accordingly, such a packet could contain data corresponding to more than one characteristic value. For example, such a packet could contain portions of the data corresponding to each of one or more certain characteristic values. It is noted that the data corresponding to a particular characteristic value could be dispersed among more than one of such packets. In various embodiments, appended to such a packet could be an indication of where the data it held was stored in the array or the like. The indication might, for instance, state the column address corresponding to the first addressable storage location that was occupied by the held data.

Next the transmitter node takes steps to transmit to one or more recipient nodes the created packets or the like holding characteristic values or parts thereof with specific section header and the, perhaps modified, originally-loaded packets or the like. It is noted that, in various embodiments, the created packets or the like holding characteristic values could be dispatched in a separate burst from the, perhaps modified, originally loaded packets or the like. In various embodiments of the invention, the characteristic values or parts thereof could be added to the, perhaps modified, originally loaded packets or the like.

Figure 3:
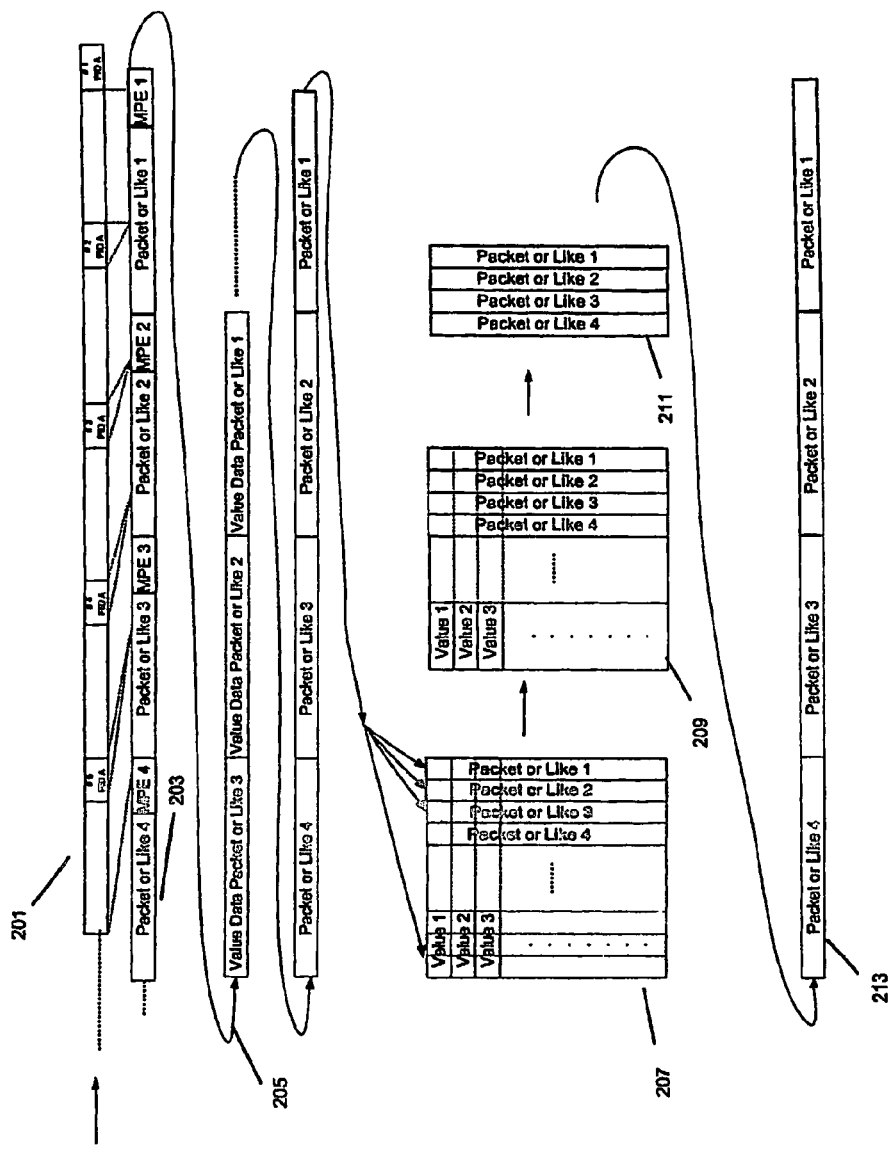
FIG. 3 is a diagram depicting exemplary steps involved in data reception according to embodiments of the present invention.

With respect to FIG. 3, the packets or the like just described arrive at a recipient node (step 205). It is noted that a recipient node might or not make use of characteristic values supplied by the transmitting node. For example, a recipient node might not be capable of making use of characteristic values. As another example, a user corresponding to a recipient node might specify, perhaps via a graphical user interface (GUI) or other interface, that characteristic values should not be employed by the node. As yet another example, a recipient node might, as will be discussed in greater detail below, make a determination as to whether or not characteristic values should be employed.

It is noted that a recipient terminal that, for instance, is incapable of making use of characteristic values, and/or has determined and/or received indication that it would not or might not make use of characteristic values, might, in various embodiments, act not to receive packets or the like dispatched by the transmitting node at all, or to receive them and to store some or all of them in a manner of its own choosing. The node might then make use of the received, perhaps modified, originally loaded packets or the like in a conventional manner. The node might delete from storage the received packets corresponding to characteristic values. Such packets may be recognized, for example, via an identifier such as PID (Program Identifier) or the like.

Alternatively, such a recipient node may act to drop packets or the like holding characteristic values without storing them. The node could, in accordance with various embodiments, recognize such packets or the like in a number of ways. For example, such packets could be recognized by their headers. More specifically, the headers of such packets might specify, for instance, a different source IP address or the like than those specified by the headers of the, perhaps modified, originally loaded packets or the like.

Where the recipient node has determined and/or received indication that it might make use of characteristic values, the node, perhaps after the storing received packets or the like in a manner of its own choosing, can perform appropriate actions to determine if the characteristic values would be employed. Such determination will be discussed in greater detail below. Where the recipient node determines and/or receives an indication that the characteristic values are not to be employed, the node could act to, perhaps after storing the received packets or the like in a manner of its own choosing, make use of the received, perhaps modified, originally loaded packets or the like in a conventional manner.

Where the recipient node determined and/or received indication that characteristic values are to be employed, the recipient node can create and/or access a two-dimensional array or the like corresponding to the array or the like created and/or accessed by the transmitting node. The array or the like created and/or accessed by the recipient node can, for example, possess one or more properties in common with the array or the like created and/or accessed by the transmitting node. For example, the array or the like created and/or accessed by the recipient node could be of the same size and/or be addressed in the same way as the array or the like created and/or accessed by the transmitting node.

In various embodiments, the transmitting node could, for example, dispatch to the recipient node an indication of properties relating to its created and/or accessed array or the like. Such properties could include, for example, array or the like column size, row size, addressing information, and/or the like. As another example, it could be established that indicated such properties be observed by all specified transmitting and recipient nodes. A system administrator or the like could set such properties.

Having performed any necessary steps to create and/or make accessible the array or the like, the recipient node loads into its array or the like the received packets or the like holding characteristic values and the, perhaps modified, originally loaded packets or the like (step 207). The loading could be in accordance with any received row and/or column address indications of the sort noted above. Accordingly, through such loading, the array or the like of the recipient load could come to match the transmitting node's array or the like before it was emptied. It is noted that, in various embodiments, such address indications would not need to be received in order for the recipient node to be able to load its array or the like so as to match the transmitting node's array or the like before it was emptied. For instance, where multiprotocol encapsulation (MPE) is employed, the recipient node might employ transport stream (TS) continuity counter values in such loading of its array or the like.

Having effectively caused its array or the like to match the transmitting node's array or the like before it was emptied, the recipient node will have reassembled the above-noted characteristic values (step 209). As a next step, the recipient node may apply each of one or more of the characteristic values to its corresponding row in the array or the like (step 211). Such application could, for example, perform FEC with respect to received, perhaps modified, originally loaded packets or the like.

It is noted that, in certain embodiments, not all characteristic values would be applied. For example, where there is more than one characteristic value per row, less than all of those values might be applied to that row. As another example, corresponding characteristic values might be applied to each of one or more certain rows, while no corresponding characteristic values might be applied to one or more other rows.

As a next step, the recipient node could act to unload its array or the like in a columnar-wise manner so as to extract the, perhaps modified and perhaps affected (e.g., corrected) in accordance with one or more characteristic values, originally-loaded packets or the like (step 213). The node could then make use of those extracted packets or the like in a conventional manner.

Although the foregoing has described the recipient node as affecting (e.g., correcting) the, perhaps modified, originally-loaded packets or the like as they are stored in the array or the like, it is noted that, in various embodiments, such application might be performed, for example with respect to such packets after their extraction from the array or the like. Moreover, it is noted that, in various embodiments, iterative use of characteristic values (e.g., Reed-Solomon data) could be performed at the receiver. For instance, turbo decoding could be employed. The performance of such turbo decoding, could involve, for example, repeated iterative of row-wise and columnar-wise use of characteristic values and/or data resulting from the application of those values. The iteration could also be performed between the proposed FEC decoding and some lower layer FEC decoding capable of delivering soft bit information.

Further, although the embodiments described herein may discuss the use of packets or the like, embodiments of the present invention are applicable in an analogous manner, for instance, to bit streams or the like. Still further, it is noted that although the embodiments described herein may discuss computation of characteristic values with respect to rows, other techniques might be employed. For instance, in various embodiments, characteristic values might be calculated in a zigzag form.

Additionally, although the embodiments described herein discuss columnar-wise loading of the array or the like, various embodiments of the present invention may act differently. For instance, such loading could be in a row-wise manner. The functionality for such embodiments would be analogous to those discussed herein, but with columnar operations being performed row-wise, and row-wise operations being performed in a columnar manner.

The characteristic values and sets of characteristic values maybe computed by selecting a number of data elements from an array having data segments comprising one or more data elements placed in row-wise or column-wise in the array and applying the computation to the selected elements and placing the resulting characteristic value into one or more predetermined places reserved for characteristic values in the same or in another array. The selection of the data elements may comprise selecting all or some of the elements in one row or column. Other selection methods, such as, for example, selecting elements from one or more diagonals in the array (zigzag), may be used as well as selecting the data elements according to a prescribed pattern.

Further, in various embodiments, the data elements are selected from the array in a random manner, wherein the number of elements may be fixed and the transmitter and the receiver know the random selection pattern. In some embodiments of the invention all data elements in the array are not necessarily used in the computations, and in other embodiments of the invention some of the elements may be used more than one time in the computations for one or more characteristic values.

A specific exemplary embodiment of the present invention will now be described.

According to this exemplary embodiment, data to be transmitted is handled by a modified DVB encapsulator. The encapsulator has the capability of receiving IP packets carried over Ethernet frames and outputting TS packets.

As a first step in this exemplary embodiment, the modified encapsulator receives Ethernet frames sequentially. The encapsulator might act to arrange and/or drop frames based on, for example, Ethernet MAC address and/or IP packet address. Criteria could be pre-determined, for instance, based on the nature of the data to be transmitted. In this step, Ethernet frame structure is removed.

As a next step, selected IP packets are placed into multi-protocol encapsulation (MPE) sections e.g., DSM-CC (Digital Storage Media Command and Control) sections.

As a next step in this exemplary embodiment, layer-3 (e.g. IP) datagrams are stored column-wise into a coding table or array. Each datagram's address in memory is stored in a header. For instance, an IP datagram's address in memory could be stored in the MAC (media access control) address bytes of its header. Time slice real-time parameters can be inserted in this phase.

Next, after the desired amount of IP datagrams have been stored into memory, FEC calculation is done row-wise. It is noted that, in the case where the IP datagrams are stored row-wise, rather than column-wise as just described, the FEC is calculated column-wise. In either case, IP datagram storing and FEC calculation could be thought of as being functionally disposed to one another at a 90 degree angle. It is also noted that IP datagrams could, alternatively, be transmitted in parallel of FEC calculation. In such a case, copies of IP datagrams could be left into memory to be used in FEC calculation. Each MPE-FEC section's address in memory is stored in a header. For instance, some of the MAC address bytes in the header of MPE section could be reserved for this purpose, in which case an MPE-FEC section's address in memory could be stored in the MAC (media access control) address bytes.

Next, upon completion of all FEC calculations, calculated FEC bytes, i.e. the FEC data in a RS data table (transported in MPE-FEC sections) is separated from Application data (transported in MPE sections). The Application data is carried within MPE sections, while RS data is carried within MPE-FEC sections. To prevent MPE-FEC frames get mixed during transmission, each MPE section and MPE-FEC section carry data from one MPE-FEC frame only. To carry all data of a MPE-FEC frame, multiple MPE sections and/or MPE-FEC sections may be needed. After this, all IP datagrams with MPE specific section format and FEC data with MPE-FEC specific section format are placed into TS packet payloads as a MPE-FEC Frame shown in FIG. 10. In this exemplary embodiment, application data and RS data are sent in TS packets with the same PID value. Again, to prevent different MPE-FEC frames get mixed, interleaving of MPE section and MPE-FEC sections carrying data from different MPE-FEC Frames is not allowed.

Operations at a receiving node, in the case where the node acts to calculate FEC, will now be described in accordance with the specific exemplary embodiment of the present invention.

As a first step, the receiving node, perhaps after filtering desired TS packets (e.g., packets with PID value "A"), removes TS packet headers and forms a respective table as in transmitting node from respective IP datagrams and FEC data from the TS packet payload data.

Next, the receiving node stores received Application data (that has been transmitted to it in MPE sections) and RS data (that has been transmitted in MPE-FEC sections) into a decoding table or array. In doing so, the receiving node uses address values from MPE section headers and MPE-FEC section headers. The receiver arranges the received data in the receiver buffer memory. Based on the "address" bits from the real-tine parameters (section header). Address specifies the location of the Application data datagram in the Application table and the MPE-FEC section payload in the FEC (RS) table.

Next, the receiving node performs the FEC decoding for the received data. MPE-FEC frames first and last sections are identified by address and burst boundary bits respectively. A "table_boundary" and "frame_boundary" flag are included in the MPE and/or the MPE-FEC section headers For example, considering the MPE-FEC frame, the flag frame_boundary=0 for all but the last MPE-FEC section of the FEC, and for tlast MPE-PEC section of the frame, the flag frame_boundary=1 signifying the end of the frame. Similarly, the table_boundary can have a value of 0 in all but the last section of the application data and the RS data table (FIG. 11). To know the size of the MPE-FEC Frame, assuming the number of columns is known, following method can be used: Assuming the size of each MFE-FEC sections of the MPE-FEC frame is equal, the number of rows is the payload size of a single MPE-FEC section multiplied by the number of MPE-FEC sections and the result divided by the number of columns used in the RS data table. A "last_section_number" field within each MPE-FEC section indicates the number of MPE-FEC sections within a MPE-FEC Frame.

After this, corrected IP datagrams that contain IP packet data are stored, preferably into same interleaving memory or forwards the data to the IP stack of the terminal to which the receiver is attached. As a next step, the IP datagrams are processed sequentially, and the IP datagram headers and trailers are removed. The resultant IP packets are passed on for conventional use.

In one embodiment, time division multiplexing (TDM) or time slicing schema is used, in which the receiver is turned on only for predefined reception times. The receiver detects beginning and/or end of the burst, and the receiver detects also beginning and/or end of the frame. In an embodiment, MPE-FEC frame and time slicing may be used together, and then a time slice burst corresponds to a MPE-FEC frame. But it is possible to use FEC without timeslicing and timeslicing without FEC.

MPE sections and MPE-FEC sections may be carried in the same burst. In such case, the size of a burst is counted for MPE and MPE-FEC together.

MPE and MPE-FEC sections that belong together are transmitted on the same elementary stream (ES). The ES is identified by the PID, which is an attribute of the transport stream packet header (transport stream packets form the MPEG-2 layer in the protocol stack picture).

If FEC is used without time slicing: The terminal knows which MPE sections and MPE-FEC sections belong to the same MPE-FEC frame because of the FEC_frame_continuity_counter (one of the real-time parameters, transported in the MPE section header and MPE-FEC section header respectively).

If FEC is used with time slicing: The FEC_frame_continutity_counter is not necessary. The terminal knows which MPE sections and MPE-FEC sections belong to the same MPE-FEC frame (identical with burst) by the timing, ie. it wakes up, receives MPE and MPE-FEC sections of the burst, then goes to sleep again until the next burst starts.

To enable different bursts for MPE section and MPE-FEC sections, the retransmission feature of Time Slicing can be used. In such case, the MPE sections are carried in an "original burst", and MPE-FEC section in "copy bursts". It is possible to differentiate bursts as "original burst" and "copy burst" by using real time parameters in connection with MPE header section headers: SI descriptor:

| | |
|---|---|
| mode | 1 (one mode) or 2 (three modes) bits |
| max_burst_duration | 3 bits |
| max_frame_size | N bits |
| data_padding_columns | N bits |
| rs_padding_columns | N bits |

| Real-time params: | |
|---|---|
| delta_t / frame_index | 12 bits |
| table_boundary | 1 bit |
| frame_boundary | 1 bit |
| address | 18 bits |
| application_data_padding | 8 bits. |

In this example, a 2 Mb limitation is appropriate for each individual burst.

However, the approach of different bursts for MPE and MPE-FEC sections may not be preferred because the receiver is on for a longer time and therefore consumes more power.

Inside one elementary stream all the sections between the first and the last section of a MPE-FEC Frame belong to same MPE-FEC Frame as the first and the last section. Inside one elementary stream all the sections of the frame shall be transmitted between (and including) the first and the last section of the frame (i.e. interleaving sections of different MPE-FEC Frames is not allowed). Between first and last section inside one frame, sections may or may not need to be transmitted in order. The MPE-FEC frames can be differentiated inside one elementary stream e.g. First and the last section may be identified within the frame by following options:

Continuity counter, or Adding a long time between MPE-FEC frames which can be achieved for example by binding one flame to be delivered within one time slice bursts, i.e. when receiver detects beginning and/or end of the burst, receiver detects also beginning and/or end of the frame, respectively.

Differentiation of different MPE-FEC frame streams (comprises of sequential MPE-FEC frames) may be conducted by lower level protocol (TS in DVB) identifier (PID in DVB) to identify frames from each other, i.e. in DVB we may use one elementary stream (e.g. identified by PID) per MPE-FEC frame stream.

Loading, Addressing, and Sizing of Two-Dimensional Arrays or the like

A two-dimensional array or the like of the sort noted above could, in accordance with various embodiments of the present invention, be loaded in a number of ways. For example, in various embodiments where loading is to be columnar-wise, implementation could be such that only one packet or the like (e.g., IP packet) is loaded per column.

For such embodiments, array row and/or column size could be chosen such that a column would be capable of holding a maximally-sized packet or the like. In the case where a packet or the like loaded into a column was of less than the maximal size, the remaining portion of the column might be filled with "stuff data". As specific example, the remaining portion could be filled with zeros.

Figure 4:
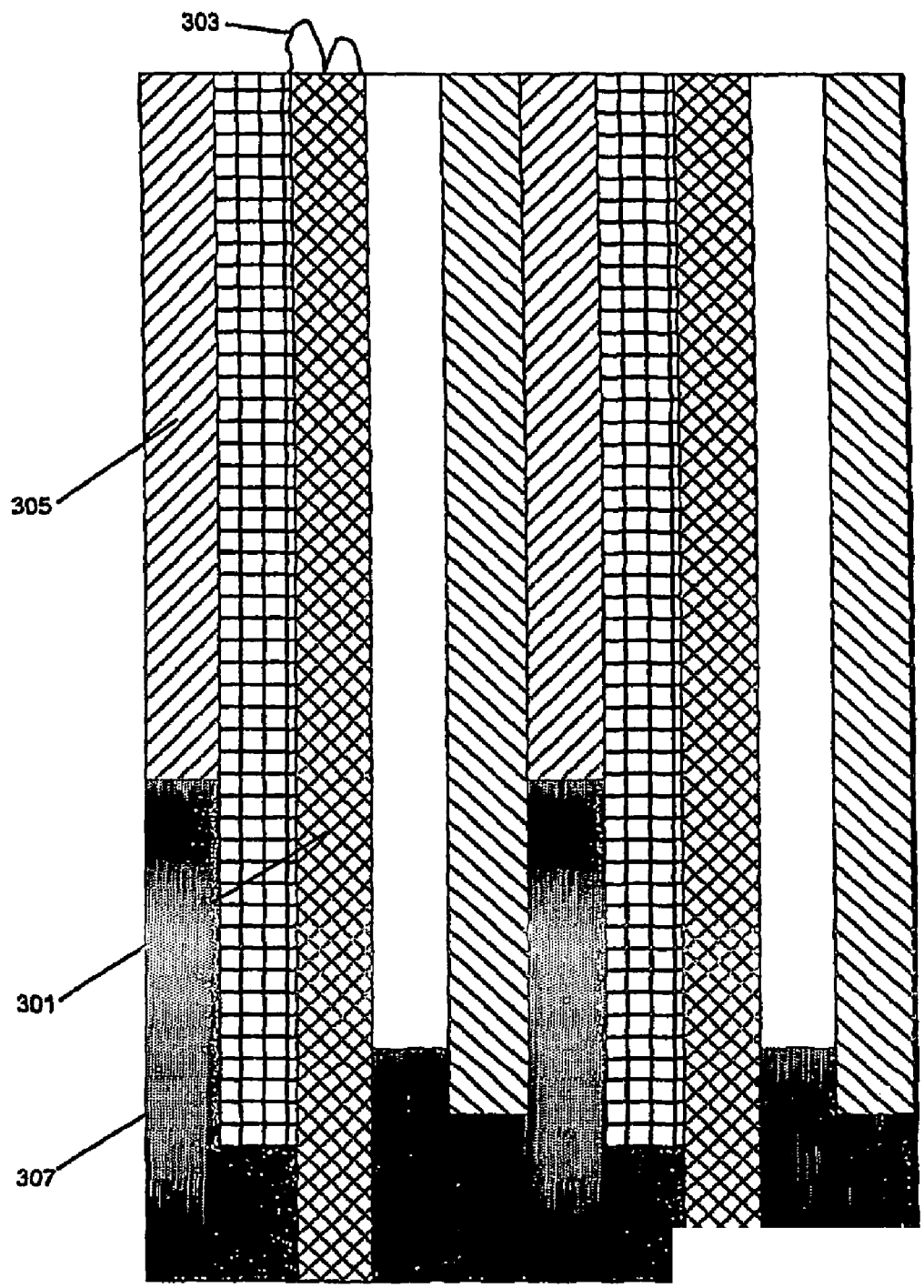
FIG. 4 is a diagram depicting a first loading technique according to embodiments of the present invention.

Shown in exemplary FIG. 4 is loading of the sort just described. In FIG. 4, exemplary packet or the like 301 is maximally sized, so no stuff data is added to the column 303 in which it resides. On the other hand, packet or the like 305 is of less than the maximal size, and, accordingly, stuff data 307 is added to its column such that the combination of packet or the like 305 and stuff data 307 occupies the entire column. It is also possible that one or more entire columns contain only stuff data. Such columns may be placed before, between, or after the columns containing data, or a combination of these may be used.

As another example of loading in various embodiments where loading is to be columnar-wise, implementation could be such that in the case where a packet or the like did not fully occupy the column into which it was loaded, loading of the column could continue with the next packet or the like to be loaded into the array or the like. Further, in the case where a packet being loaded into a column could not fully fit into that column, those portions which did not fit could be placed in one or more additional columns.

Such functionality could be implemented, for example, in such a manner that where a particular packet or the like did not fully fit inside a column, the column would be filled with contents of the packet or the like up to the column's last addressable element (e.g., the element of the column having the highest row-wise address), and the remainder of the packet or the like could be placed in the following column, starting with that columns first addressable element (e.g., the element of the column having the lowest row-wise address).

Figure 5:
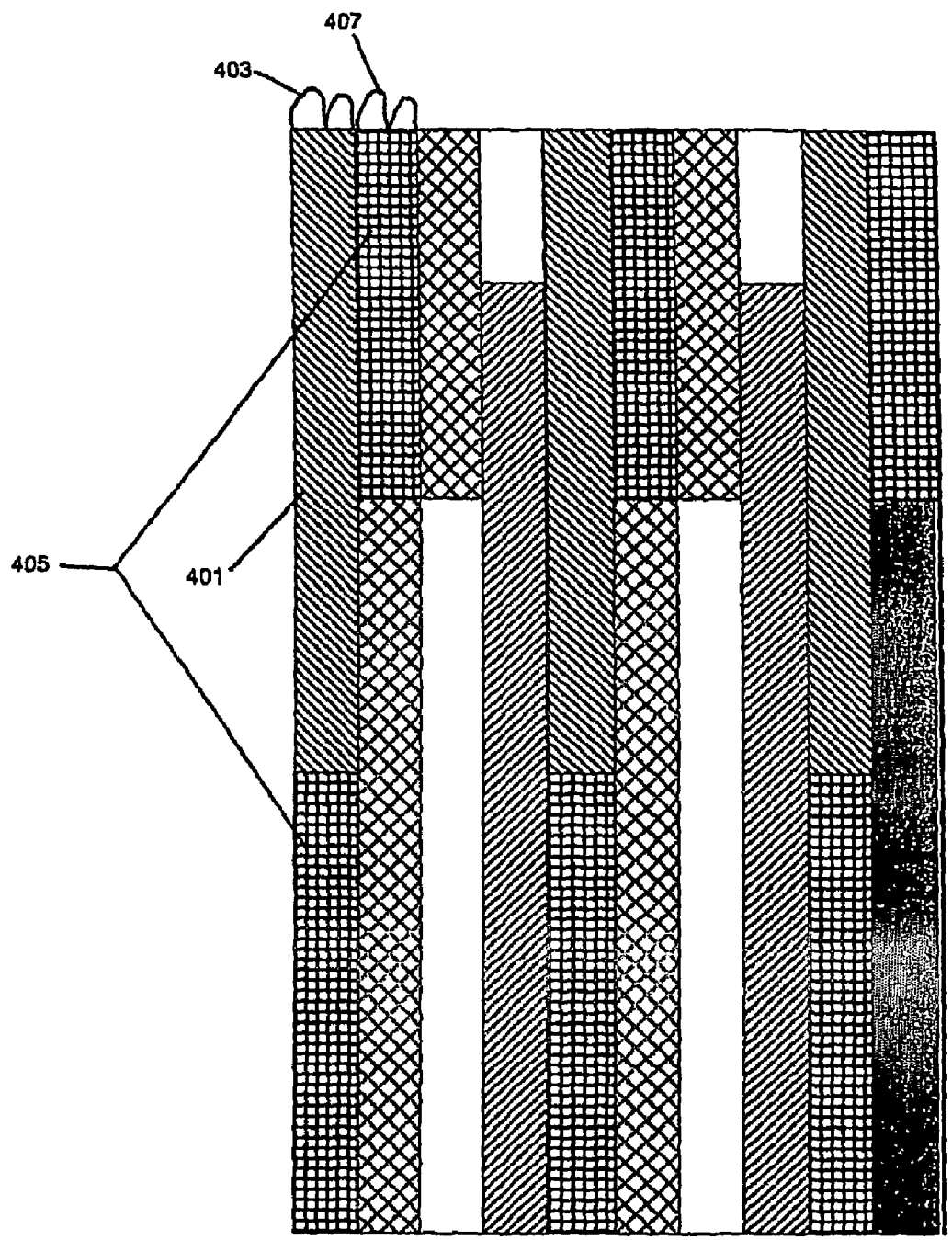
FIG. 5 is a diagram depicting a second loading technique according to embodiments of the present invention.

Shown in exemplary FIG. 5 is loading of the sort just described. In FIG. 5, exemplary packet or the like 401 does not fully fill column 403 into which it was loaded, and the remainder of column 403 is accordingly filled with portions of packet or the like 405. However, as packet or the like 405 can not fully fit with in the portion of column 403 left unfilled by packet or the like 401, the remainder of that packet or the like is placed in column 407, starting, in this example, with the first element (e.g. the element of the column having the lowest row-wise address).

It is noted that, in various embodiments of the sort just described, stuff data might be placed between placed packets or the like. Such functionality might be implemented, for instance, with the goal of rounding out the lengths of packets or the like so that the length of a packet or the like and its associated stuff data would have, for instance, a length that was a whole wordlength (byte) multiple. For embodiments where such functionality was employed, addressing schemes for the corresponding array or the like could be simplified, as, for embodiments where loading was to be columnar-wise, row-wise addressing could be implemented with a whole-byte granularity. Also in embodiments of the sort described, it is possible to use full columns of stuff data either between the columns filled with data, before or after the columns filled with data, or via a combination of both those techniques.

It is noted that, for embodiments implementing loading in a manner where only one packet or the like is placed per column, indications of the sort noted above relating to where particular packets or the like were placed in the corresponding array or the like might, where loading was columnar, need only relate the columnar address corresponding to where in the array or the like the packet or the like was stored.

Implementation could, for example, be such that it would be understood at the recipient node that received packets or the like were to be placed in the first addressable element of the indicated column (e.g., the element of the column having the lowest row-wise address), and that unfilled portions of such a column were to be filled with stuff data. On the other hand it is noted that, for embodiments implementing loading in a manner where more than one packet or the like might placed per column, an indication of the sort noted above might need to specify both a row-wise and columnar address.

Turning to addressing, it is noted that, according to various embodiments of the present invention, an addressing scheme could be determined for an array or the like of the sort noted above. When thought of with respect to an array or the like of a particular size, selection of addressing scheme might be viewed as having the effect of determining the number of addressable elements in that array or the like It is further noted that, when thought of with respect to an array or the like of a particular size, selection of a row-wise addressing scheme might be viewed as having the effect of determining the number of rows in an array or the like of the sort noted above, while selection of a columnar-wise addressing scheme might be viewed as having the effect of determining the number of columns in an array or the like of the sort noted above. Still further, it is noted that selection of row-wise and columnar-wise addressing schemes might, when thought of with respect to an array or the like of a particular size, be thought of as selection of the size of each addressable element of the array or the like.

As a specific example, an array or the like of the sort noted above could be implemented so that both row and column addressing were implemented with one-byte granularity. As another specific example, where an array or the like of he sort noted above was to be loaded with data columnar-wise, columnar-wise addressing could be chosen so as to make maximal use of available address space. For instance, where 32-bit addressing was available, columnar addressing could be chosen so as to allow for the maximum possible number of columns, the determination perhaps taking into account the maximum size of data (e.g., IP packets) to be stored in the array or the like.

As yet another specific example where loading was to be columnar-wise, row-wise addressing could be implemented such that the resultant number of rows was optimized for channel error behavior. As still another specific example where loading was to be columnar-wise, row-wise addressing could be implemented such that the resultant number of rows would be consistent with the properties of a particular characteristic value determination (e.g., FEC) technique.

Turning to size, it is noted that selection of the size of an array or the like of the sort noted above could be approached in terms of selecting a row width and a column height for the array or the like. Size selection could, according to various embodiments of the present invention, be implemented in a number of ways. For example, where loading is to be columnar-wise, column height could be chosen to be consistent with the maximal size of a packet or the like of the sort to be loaded into the array or the like. Alternately, some other value might be chosen. Such choice might be performed, for example, by a system administrator or other individual.

The row width for an array or the like with a column height so chosen could be selected in a number of ways. For instance, the row width could be chosen by deciding upon a maximum number of packets or the like that would be allowed to be sent within a burst, and then determining the extra room in the array or the like that would be required for the corresponding characteristic value or values. For such embodiments, array or the like characteristics could be known by transmitting nodes and recipient nodes ahead of time. The width of an array may be chosen to comply with the selected method for computing characteristic values. The selected method can determine both the number of columns for data and the number of columns for characteristic values. As an example, the selection of Reed-Solomon encoding 255 can lead to 191 columns for data and 64 columns for characteristic values.

As another example where loading is to be columnar-wise, transmitting nodes could vary size of the array or the like for each burst dispatched. As a specific example, a transmitting node might select column height and row width in such that the corresponding array or the like could hold all of the packets or the like and any corresponding characteristic data to be transmitted within a particular burst. As another example, the transmitting node could act in a similar manner, but in accordance with a specified and/or fixed column height or row width. Where, for example, column height was specified, such column height might be consistent with the maximal size of a packet or the like of the sort to be loaded into the array or the like, or might be some other value. For embodiments, where column height and/or row width is not fixed, a transmitting node could, as alluded to above, dispatch to a recipient node one or more size indications. It is noted that in various embodiments where the size of the array or the like is fixed, in the case where less than all of the array or like is used, the transmitting node might send to a recipient node an indication of what portion of the array or the like is to be used. Such an indication might be, for example, an address.

As alluded to above, although the foregoing has been discussed with respect to arrays or the like loaded columnar-wise, it is noted that in various embodiments loading could be row-wise, and that in such embodiments functionality could be analogous to that discussed above, but with row-wise aspects being columnar-wise and vice versa.

Determination of whether or not Characteristic Data should be Employed

As alluded to above, according to various embodiments of the present invention, a recipient node might perform appropriate actions to determine if received characteristic values should be employed. Such actions might be performed, for example, in accordance with instructions placed by the node's user via, for instance, a GUI or other interface. Various schemes could be employable by a node for determining of characteristic values could be employed.

For example, in embodiments where received characteristic values corresponding to FEC or the like, a scheme could be employed wherein a recipient node would determine if there were errors in the received, perhaps modified, packets or the like originally-loaded by the corresponding transmitting node. The recipient node might, for example, employ CRC (Cyclic Redundancy Check) techniques in making the determination. In the case where errors were found, the recipient node might act to employ one or more of the received characteristic values. Also, other lower layer channel decoding may be used for the determination. The use of lower layer channel decoding may also give indication of where errors are.

As another example for embodiments where loading of packets or the like is columnar-wise, where more than one characteristic value is determined for one or more rows, the recipient node might act to employ, for each of those rows, only one of the corresponding characteristic values. The recipient node might make such choice, for instance, in accordance with characteristics corresponding to detected error. Such characteristics might include, for example, error type, extent, and/or the like.

As yet another example for embodiments where loading of packets or the like is columnar-wise, the recipient node might choose to apply corresponding characteristic values with respect to certain rows but not others. As above, the recipient node might make such choice, for instance, in accordance with characteristics corresponding to detected error.

According to a further exemplary scheme, a recipient node might only act to employ received characteristic values if it determined that it had sufficient memory available. Having sufficient memory could, for instance, mean having sufficient memory to create and/or access an array or the like corresponding to the array or the like created and/or accessed by the corresponding transmitting node, and/or having sufficient memory to perform operations with regard to received characteristic values.

Performance of such a scheme could involve, for example, the recipient node consulting a specification of the required size for the array or the like, determining its amount of free and/or freeable memory, and determining if sufficient memory was available. As another example, performance of such a scheme could alternately or additionally involve the recipient node determining the amount of memory to perform operations with regard to received characteristic values. The specification of required size could, for example, be included in a dispatched indication of the sort noted above. As another example, the specification of required size could be in compliance with a size set to be employed for all arrays or the like as discussed above.

According to yet another exemplary scheme, a recipient node might only act to employ received characteristic values if it determined that there was sufficient energy (e.g., battery power) and/or available processing capacity to do so. Such functionality could be implemented in a number of ways. For example, a recipient node could make the above-noted determination of the type, extent, and/or the like of errors to be corrected. The node might next, perhaps taking into account the type or types of included characteristic data included (e.g., Reed-Solomon data), make an estimate of the necessary energy and/or available processing capacity to correct the errors. Viewing the estimate in light of determined available energy and/or processing capacity, the node could decide if there was sufficient energy and/or processing capacity to make use of the characteristic data.

The node could make the estimate, for example, by performing calculations using accessible algorithms, software modules, and/or the like. As another example, the node could make the estimate by consulting an accessible store that associated error types, error extents, and/or the like to be corrected with required energies and/or available processing capacities. The node could determine available energy and/or processing capacity, for instance, using functions provided by its operating system and/or loaded software modules.

According to yet another exemplary scheme, a recipient node might only act to employ received characteristic values for certain services, channels, data types, and/or the like. For instance, a recipient node might only act to employ received characteristic data for software and/or file downloads. A node's user might, in various embodiments, be able to specify the services, channels, data types, and/or the like for which received characteristic data should be employed. Further, in various embodiments, such might be specifiable by a system administrator or the like. Further services, channels, data types and/or the like may influence to payment of them and it may occur through graphical user interface (GUI) of the terminal.

According to yet another exemplary scheme, a transmitting node may compute and employ characteristic values only for certain services, channels, data types, and/or the like.

Figure 8:
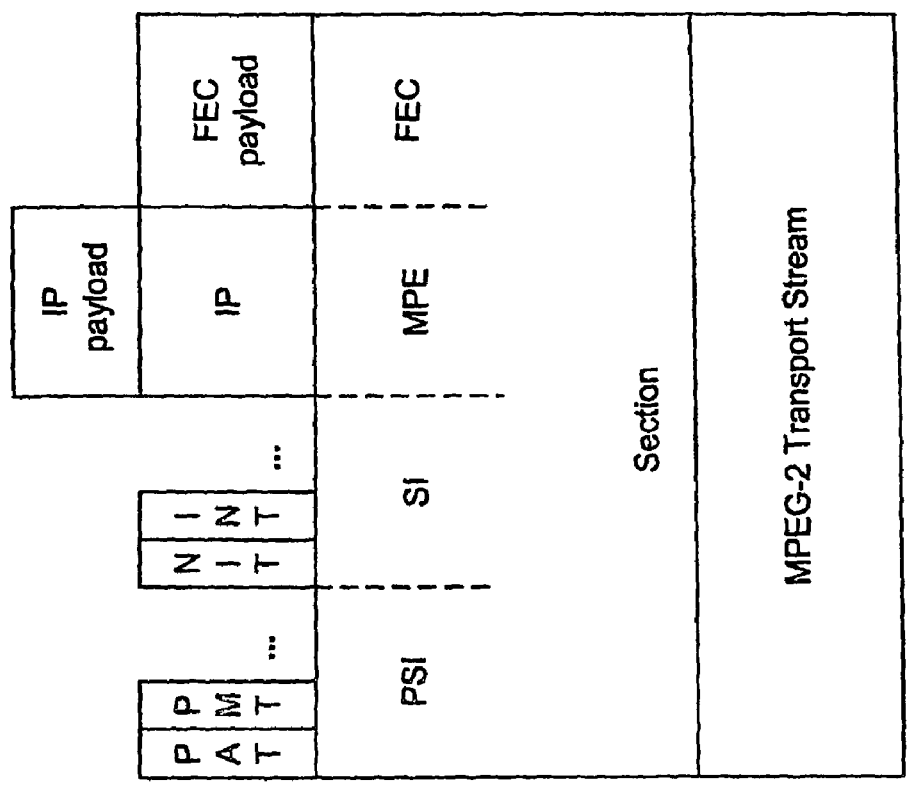
FIG. 8 is a diagram of the protocol stack of an embodiment of the invention.

Turning to the embodiments of FIG. 8, an example of the transmission protocol stack is shown. Some basis for the transmission of the embodied invention can be based on the ISO/IEC 13818-1 MPEG-2 based stream transmission. For example, TS can be based on the transmission according to the ISO/IEC 13818-1. Preferably, PSI/SI tables contain the information necessary to announce and discover the transmitted service. Advantageously, the MPE and FEC tables can be added to the protocol stack of FIG. 8 in parallel to the basics PSI/SI information. The PSI defines the table for focusing i.e. the Program Association Table (PAT) and for the Program Map Table (PMT) and further the SI defines the Network Information Table (NIT) and the IP/MAC Notification Table (INT) all relating to providing information on the stream. For example the elementary stream or the transport stream depending on the layer of the applied service. The MPE focuses on the IP data packet, i.e. the IP payload. The payload can be included in the MPE section packet along with a header. The MPE section packet can be applied in the higher level FEC frame for the error correction procedure. The FEC focuses on FEC payload. In some embodiments the FEC based and MPE based information can be separated in respect to each other. The FEC based information or the like and the MPE based information or the like are necessarily not broken into apart for good but the idea in some embodiments is to identify the FEC information and the MPE information with different headers. The FEC based information and MPE based information is preferably, in parallel with respect to the PSI and SI hierarchy layer level so that in some embodiments it is possible to perform and set the basis for the separation possibly in an early stage of the broadcast transmission/reception. The PSI/SI set a basis for the early and basics service discovery.

Referring to FIG. 9, a header for the protection payload relating, thus, to the MPE application data table or MPE section packets, can be denoted by a unique identifying value or name. The example in FIG. 9 is given with value Table_id set to correspond with N. Also, a header for the FEC data can be denoted by a unique identifying value or name. The example in FIG. 9 is given with value Table_id set to indicate a value M. It should be noted that other values/characters can be presented to unique or at least with respect to each other separate and identify the MPE application data table and the FEC data table.

Encapsulation Operations

MPE can be employed in various embodiments of the present invention. As also alluded to above, such MPE might, for example, be DSM-CC MPE. Information regarding MPE can be found, for example, in ETSI document TR 101 202, incorporated herein by reference. An exemplary use of MPE in accordance in embodiments of the present invention is shown in FIG. 2.

As shown in FIG. 2, a transmitting node places data segments into MPE DSM-CC sections packets or the like (e.g., IP packets) carrying data corresponding to computed characteristic values and/or, perhaps modified, originally-loaded packets or the like (e.g., IP packets) (step 109). As a next step, the DSM-CC sections could, for example, be placed in MPEG-2 TS packets (step 111). In various embodiments, a first PID value is associated with TS packets carrying data corresponding to the, perhaps modified, originally-loaded packets or the like, while a second PID value is associated with TS packets carrying data corresponding to characteristic values. The TS packets may be transmitted over a link such as, for example, a DVB link i.e. in a common elementary stream. From the foregoing description of FIG. 2, it will understood that the characteristic values can be FEC data such as RS codes and that the encapsulated data can be placed in MPE-FEC frames as shown in FIG. 10. More specifically, the application data segments may comprise layer-3 datagrams, namely IP datagrams. These IP datagrams are written columnwise into the two dimensional array structure at the transmitter node as previously described with reference to FIG. 2. The columns 101 shown in FIG. 2 are loaded in to the application data table in a MPE-FEC frame shown in FIG. 10. Each position in the array hosts an information byte. In more detail, the left part of the frame consists of the 191 leftmost columns, are dedicated for OSI layer 3 (Network layer) datagrams (e.g. IP datagrams) and possible padding, and is called the Application data table ADT in FIG. 10. The right part of the frame, consists of 64 rightmost columns which are dedicated for the parity information of the FEC code and is referred to as the RS data table, which labeled RST in FIG. 10. Each byte position in the Application data table has an address ranging from 0 to 191× number of rows −1. In the same way, each byte position in the RS data table has an address ranging from 0 to 64× number of rows −1. The Layer 3 datagrams are introduced datagram-by-datagram, starting with the first byte of the first datagram in the upper left corner of the matrix and going downwards the first column. The length of the datagrams may vary arbitrarily from datagram to datagram. Immediately after the end of one datagram the following datagram starts. If a datagram does not end precisely at the end of a column, it continues at the top of the following column. When all datagrams have entered the Application data table, any unfilled byte positions are padded with zero bytes, which makes the leftmost 191 columns completely filled. The position of the delivered RS data in the RS data table is indicated with a section_number. Section 0 carries the first (left most) column of the RS data table, section 1 carries the second column, and so on. Any columns not delivered are always the right most columns of the RS data table.

This 18-bit field specifies the byte position in the Application data table or RS data table of FIG. 10 for the first byte of the payload carried within the section. All sections delivering data for Application data table or RS data table are delivered in ascending order according to the value of this field.

The bytes position is a zero-based linear address within Application data table or RS data table, starting from the first row of the first column, and increasing towards the end of the column. At the end of the column, the next byte position is at the first row of the next column.

The first section carrying data of a given MPE-FEC Frame is MPE section carrying the Application data datagram at address "0". All sections carrying Application data datagrams of a given MPE-FEC Frame are transmitted prior to the first section carrying RS-data of the MPE-FEC Frame (i.e. sections carrying Application data datagrams shall not be interleaved with sections carrying RS-data within a single MPE-FEC frame). All sections carried between the first and the last section of an MPE-FEC Frame carry the data belonging to the MPE-FEC Frame (i.e. only Application data and RS-data are allowed). Sections delivering data of different MPE-FEC Frames are not interleaved.

The section following the last section carrying Application data datagram on an MPE-FEC Frame, contains either the first section carrying the RS-data of the same MPE-FEC Frame, or the first Application data section of the next MPE-FEC Frame. In the later case, RS-data of the first MPE-FEC Frame is not transmitted, for example when not needed by the recipient node.

For each MPE-FEC Frame there is transmitted exactly one MPE section with address field set to value "0". For each MPE-FEC Frame for which any RS data is transmitted exactly one MPE-FEC section is transmitted with an address field set to value "0". Padding shall not exist within delivered Application data in the Application data table. Datagrams do not overlap in an Application data table. Padding does not exist within delivered RS data in the RS data table.

FIG. 10 is schematic and corresponds to columnar datagrams of equal length. This is theoretically possible and a network operator who manages and administers the network may define the height of the columns. However, in practice, the size of IP datagrams changes from datagram to datagram and typically the sizes are between ~100 . . . 1500 Bytes and unfilled parts of the datagrams may be filled with '0' padding as previously described.

Then the RS data is computed by considering the rows of the array of application data table 101 in FIG. 10 to create the configuration 103 shown in FIG. 2, and the resulting rows of RS data are loaded into the RS data table of FIG. 10. The RS codes are computed to a predetermined resolution such as RS(255,191 or 64) and is calculated for every row separately. Then, for the step 105 of FIG. 2, the MPE-FEC frame of FIG. 10 is emptied, starting from the first IP datagram of the application data table. The IP datagrams are packed in MPE sections. (1 IP datagram per MPE section)

The address of IP datagram in application the data table 101 is put into a MPE section header field. On an elementary stream where Time Slicing or MPE-FEC is used, each MPE section and MPE-FEC section carries real time parameters in its header field as described in Table 1 below. For the MPE sections, real time parameters are carried within the MAC_address_4 . . . MAC_address_1, which would otherwise be unused, thereby optimizing bandwidth.

TABLE 1

| Syntax | No. of bits | Identifier |
|---|---|---|
| real_time_parameters ( ) { | | |
| delta_t | 12 | uimsbf |
| table_boundary | 1 | bslbf |
| frame_boundary | 1 | bslbf |
| address | 18 | uimsbf |
| } | | |

In the same step also other real time parameters are filled into MPE section header field. After last IP datagram in the MPE section, the real time parameter table boundary is set to '1' to indicate that this MPE section includes the last IP datagram from the application data table.

Then, the columns of the RS table in FIG. 10 are emptied starting from the first column (=closest column to Application data table). The RS bytes of each column of the MPE-FEC table are packed together an individual MPE-FEC section. As shown in FIG. 11 the RS bytes are put to RS-FEC bytes). The real time parameters are coupled to MPE-FEC section header respectively as done to MPE sections above. The length of the MPE-FEC section—(MPE-FEC section header+trailer) indicates to the receiver the number of rows of used in the MPE-FEC frame. The number of rows is signaled to the receiver in the time_slice_fec_identifier_descriptor. The maximum allowed value for this is 1024, which makes the total MPE-FEC frame almost 2 Mbits in this example. All calculated RS data bytes need not to be sent depending on the capacity and/or service quality e.g. if the end user is happy with less quality of service. For example, such a packet could contain portions of the data corresponding to each of one or more certain characteristic values. The exact amount of punctured RS columns does not need to be explicitly signaled and may change dynamically between frames. The exact number of padding columns of the Application data table is signaled in the header of each MPE-FEC section. This 8-bit field indicates the number of full columns of the Application data table of the actual MPE-FEC Frame filled with padding bytes only. The value indicated shall be from 0 to 190. Note that the value may vary frame by frame. The number of punctured RS columns can be calculated as 63—last_section_number, since last_section_number indicates the section number of the last section. As the section numbering is zero based, the indicated number is one less than the number of columns.

The receiver introduces the number of padding bytes in the Application data table, as indicated in the MPE-FEC sections. These padding bytes it marks as reliable. The receiver also introduces the number of punctured RS columns as calculated from last_section_number. The actual data in the introduced punctured RS columns are irrelevant, as all punctured data is considered unreliable.

All MPE and MPE-FEC sections are protected by a CRC-32 code, which reliably detects all erroneous sections. For every correctly received section belonging to the Application data table or to the RS data table, the receiver looks in the section header for the start address of the payload within the section and is then able to put the payload in the right position the respective table.

Further, as shown in FIG. 3, a recipient node, having received TS packets of the sort noted above (step 201), can extract the DSM-CC sections carried by these packets (step 203). Next, the node cextracts from those DSM-CC sections packets or the like (e.g., IP packets) carrying data corresponding to computed characteristic values and/or carried, perhaps modified, originally-loaded packets or the like (e.g., IP packets) (step 205).

Although DSM-CC MPE has been discussed here, it will be noted that other MPE techniques could be employed. It is further noted that although the foregoing has described implementation of MPE such that DSM-CC sections are not placed into the array or the like, in various embodiments DSM-CC sections carrying above-described packets or the like could be placed there.

Puncturing

Effectively weaker code rates than that of the mother code may be achieved by puncturing mentioned briefly above. Puncturing corresponds to calculating all the characteristic values (all columns) but then some columns are discarded or "punctured" and therefore not transmitted. Puncturing can be performed in the embodiments described herein by discarding one or more of the last RS data columns. The number of discarded (punctured) RS columns may vary dynamically between MPE-FEC frames within the range [0-63] and can be calculated as 63—last_section_number, except for the case when no RS columns are transmitted (puncturing is 64 columns). Puncturing will decrease the overhead introduced by the RS data and thus decrease the needed bandwidth. The drawback of puncturing is an effectively weaker error checking code rate. It is noted that, in various embodiments, the manner in which characteristic values were computed can vary dynamically. As a specific example, where characteristic values corresponded to FEC data (e.g., Reed-Solomon data), the amount of parity data to be added could vary dynamically. For instance, more parity data could be added where network conditions arose that were expected to result in greater transmission error. Furthermore conditions when less parity information may be satisfactory may also exist.

Time Slicing

This descriptor identifies whether Time Slicing or MPE-FEC are used on an elementary stream. Note that when this descriptor specifies an elementary stream being Time Sliced and/or MPE-FEC being used, a data_broadcast_descriptor parameter is provided in a service description for a particular service. This defines a MAC_address_range of value 0x01 or 0x02, indicating that the MAC_address_1 . . . 4 bytes are not used to differentiate receivers within the elementary stream. This descriptor is allowed in following tables:

Network Information Table (NIT)

When located in the first descriptor loop, the descriptor applies to all transport streams announced within the actual table. All elementary streams with stream_type 0x0D on any of the transport streams are applied.

When located in the second descriptor loop, the descriptor applies to the concerned transport stream. All elementary streams with stream_type 0x0D are applied. This descriptor overwrites possible descriptors in the first descriptor loop.

IP/MAC Notification Table (INT)

When located in the platform descriptor loop, the descriptor applies to all elementary streams referred within the table. This descriptor overwrites possible descriptors in NIT.

When located in the target descriptor loop, the descriptor applies to all elementary streams referred within the concerned target descriptor loop after the appearance of the descriptor. This descriptor overwrites possible descriptors in the platform descriptor loop and in NIT. In case an elementary stream is referred from multiple locations within an INT, each shall contain the same signaling.

Semantics for Time Slice and FEC Identifier Descriptor will now be Discussed in more Detail:

descriptor_tag: will have a predetermined own value agreed by a standard.

descriptor_length: This 8-bit field specifies the number of bytes of the descriptor immediately following this field.

time_slicing: This 1-bit field indicates, whether the referred elementary stream is Time Sliced.

Value '1' indicates Time Slicing being used. Value '0' indicates that Time Slicing is not used.

mpe_fec: This 2-bit field indicates, whether the referred elementary stream uses MPE-FEC, and what algorithm is used. Coding can be as stipulated in Table 2 below.

max_burst_duration: This 8-bit field is used to indicate the maximum burst duration in the concerned elementary stream. A burst shall not start before T1 and shall end not later than at T2, where T1 is the time indicated by delta-t on the previous burst, and T2 is T1+maximun burst duration. The indicated value for maximum burst duration shall be from 20 ms to 5,12 s, resolution is 20 ms, and the field is decoded according to the following formula:

Maximum burst duration=max_burst_duration*20 milliseconds

In case time_slicing is set to "0" (i.e. Time Slicing not used), this field is reserved for future use and shall be set to 0x00 when not used.

frame_size: This 5-bit field is used to give information that a decoder may use to adapt its buffering usage. The exact interpretation depends on whether Time Slicing and/or MPE-FEC are used.

When Time Slicing is used (i.e. time_slicing is set to "1"), this field indicates the maximum number of bits on section level allowed within a Time Slice burst on the elementary stream. Bits are calculated from the beginning of the table_id field to the end of the CRC_32 field. In case MPE-FEC is used (i.e. mpe_fec is set to "1"), this field indicates the exact number of rows on each MPE-FEC Frame on the elementary stream.

When both Time Slicing and MPE-FEC are used on the concerned elementary stream, both limitations (i.e. the maximum burst size and the number of rows) apply.

Coding is according to Table 3. In case the max_frame_size has value indicated as "reserved_for_future_use", the receiver shall assume the maximum burst size greater than 2 Mbits and MPE-FEC Frame rows more than 1024.

TABLE 2

MPE-FEC algorithm

| value | MPE-FEC | algorithm |
| --- | --- | --- |
| 0x00 | MPE-FEC | not used n/a |
| 0x01 | MPE-FEC | used Reed-Solomon(255, 191, 64) |
| 0x02 . . . 0x03 | reserved for future use | reserved for future use |

TABLE 3

Size coding

| Size | Max Burst Size | MPE-FEC frame rows |
| --- | --- | --- |
| 0x00 | 128 kbits = 131 072 bits | 64 |
| 0x01 | 256 kbits | 128 |
| 0x02 | 384 kbits | 192 |
| 0x03 | 512 kbits | 256 |
| 0x04 | 640 kbits | 320 |
| 0x05 | 768 kbits | 384 |
| 0x06 | 896 kbits | 448 |
| 0x07 | 1 024 kbits | 512 |
| 0x08 | 1 152 kbits | 576 |
| 0x09 | 1 280 kbits | 640 |
| 0x0A | 1 408 kbits | 704 |
| 0x0B | 1 536 kbits | 768 |
| 0x0C | 1 664 kbits | 832 |
| 0x0D | 1 792 kbits | 896 |
| 0x0E | 1 920 kbits | 960 |
| 0x0F | 2 048 kbits | 1024 |
| 0x10 . . . 0x1F | reserved for future use | reserved for future use |

In the event that time slicing is not used i. e. MPE-FEC frames are transmitted without any time slicing a field that supports a cyclic MPE-FEC Frame index within the elementary stream can be used for control purposes. The value of the field increases by one for each subsequent MPE-FEC Frame. After value "11111111111", the field restarts from "000000000000".

Hardware and Software

Certain procedures and the like described herein may be executed by or with the help of computers. The phrases "computer", "general purpose computer", and the like, as used herein, refer but are not limited to a processor card smart card, a media device, a personal computer, an engineering workstation, a PC, a Macintosh, a PDA, a computerized watch, a wired or wireless terminal, a server, a network access point, a network multicast point, or the like, perhaps running an operating system such as OS X, Linux, Darwin, Windows CE, Windows XP, Palm OS, Symbian OS, or the like, perhaps with support for Java or .Net.

Figure 6:
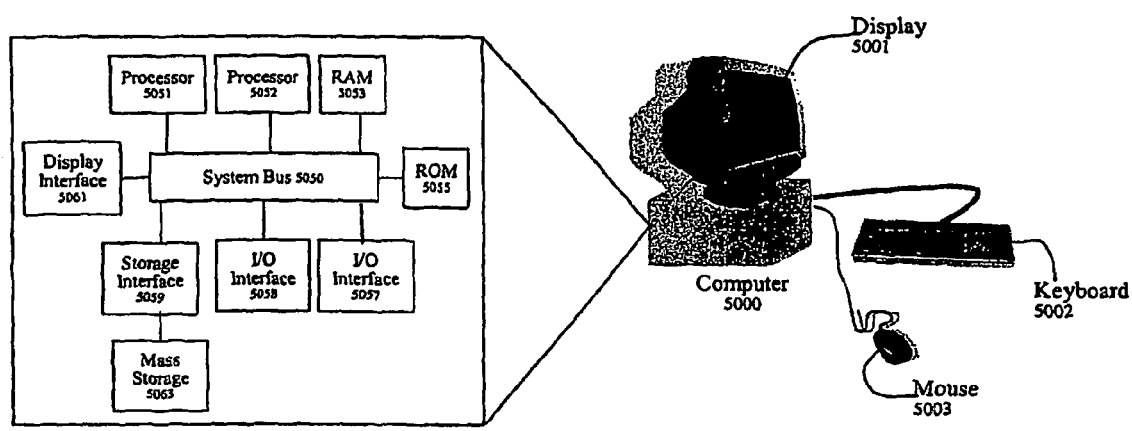
FIG. 6 shows an exemplary general purpose computer employable in embodiments of the present invention.

The phrases "general purpose computer", "computer", and the like also refer, but are not limited to, one or more processors operatively connected to one or more memory or storage units, wherein the memory or storage may contain data, algorithms, and/or program code, and the processor or processors may execute the program code and/or manipulate the program code, data, and/or algorithms. Accordingly, exemplary computer 5000 as shown in FIG. 6 includes system bus 5050 which operatively connects two processors 5051 and 5052, random access memory 5053, read-only memory 5055, input output (I/O) interfaces 5057 and 5058, storage interface 5059, and display interface 5061. Storage interface 5059 in turn connects to mass storage 5063. Each of I/O interfaces 5057 and 5058 may be an Ethernet, IEEE 1394, IEEE 1394b, IEEE 802.11a, IEEE 802.11b, IEEE 802.11g, IEEE 802.16a, IEEE P802.20, Bluetooth, terrestrial digital video broadcast (DVB-T), satellite digital video broadcast (DVB-S), digital audio broadcast (DAB), general packet radio service (GPRS), universal mobile telecommunications service (UMTS), or other interface known in the art.

Mass storage 5063 may be a hard drive, optical drive, or the like. Processors 5057 and 5058 may each be a commonly known processor such as an IBM or Motorola PowerPC, an AMD Athlon, an AMD Opteron, an Intel ARM, an Intel XScale, a Transmeta Crusoe, or an Intel Pentium. Computer 5000 as shown in this example also includes an display unit 5001, a keyboard 5002 and a mouse 5003. In alternate embodiments, keyboard 5002, and/or mouse 5003 might be replaced and/or augmented with a touch screen, pen, and/or keypad interface. Computer 5000 may additionally include or be attached to card readers, DVD drives, floppy disk drives, and/or the like whereby media containing program code may be inserted for the purpose of loading the code onto the computer.

In accordance with the present invention, a computer may run one or more software modules designed to perform one or more of the above-described operations. Such modules could be programmed using languages such as Java, Objective C, C, C#, and/or C++ according to methods known in the art. Corresponding program code might be placed on media such as, for example, DVD, CD-ROM, and/or floppy disk. It is noted that any described division of operations among particular software modules is for purposes of illustration, and that alternate divisions of operation may be employed. Accordingly, any operations discussed as being performed by one software module might instead be performed by a plurality of software modules. Similarly, any operations discussed as being performed by a plurality of modules might instead be performed by a single module.

Further, although embodiments of the invention may disclose certain software modules, tiers, and/or the like as operating on certain devices, in alternate embodiments these modules, tiers, and/or the like might be distributed to run on other devices than those stated. For example, operations disclosed as being performed by a particular computer might instead be performed by a plurality of computers. It is further noted that, in various embodiments, grid computing techniques may be employed.

Figure 7:
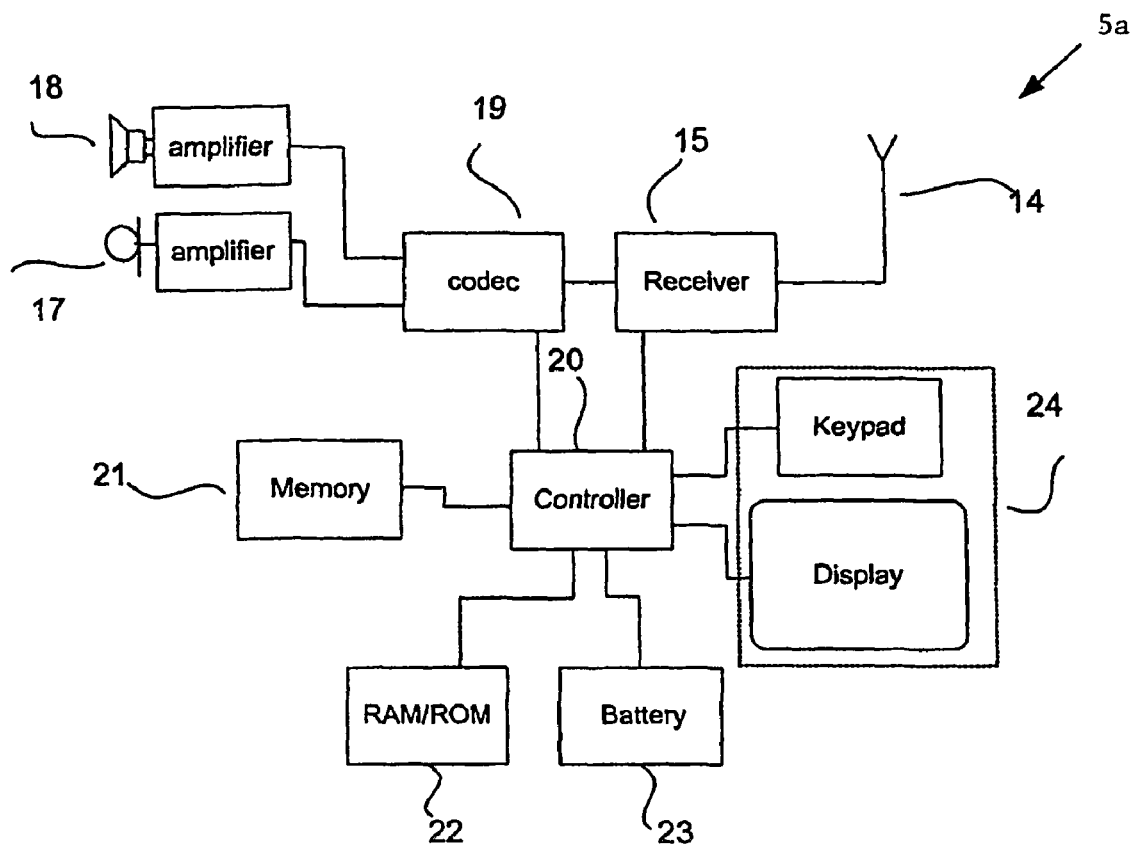
FIG. 7 shows a functional block diagram of an exemplary node employable in embodiments of the present invention.

Shown in FIG. 7 is a functional block diagram of an exemplary terminal employable in various embodiments of the present invention. The receiving device 5a may be a mobile telephone with multimedia capabilities, which receives incoming data using one or more antennae 14 or several antennas and one or more receivers 15. For example, multiple antennae 14 and receivers 15 would be needed where the first and second communication network utilize different radio technologies. Especially this the case when the other communication link e.g. GSM, GPRS or 3G type communication link and the other one digital broadband, like DVB communication link as described in FIG. 1. A battery 23 powers the mobile telephone 5a. As the reception of data consumes a large proportion of the battery power, the consumption of battery may be controlled, e.g. if the receiver is on only on request or as needed, and then is particularly advantageous for such a device. The method of providing redundancy packets over other communication network makes it possible to have terminals, which do not have any error correction implemented (low end terminals). Subscribers having 'high end' terminals could have as extra benefit the possibility to get recovery packets from second network. The terminal of FIG. 7 has been discussed in the foregoing. In the following, corresponding reference signs have been applied to corresponding parts. Terminal 5a of FIG. 7 may be used in any/all of the embodiments described herein. The terminal 5a comprises a processing unit CPU 20, a multi-carrier signal terminal part 15 and a user interface 24. The multi-carrier signal terminal part 15 and the user interface 24 are coupled with the processing unit CPU 20. One or more direct memory access (DMA) channels may exist between multi-carrier signal terminal part 15 and memory 21, 22. The user interface 24 comprises a display and a keyboard to enable a user to use the terminal 5a. In addition, the user interface 24 comprises a microphone and a speaker for receiving and producing audio signals. The user interface 24 may also comprise voice recognition (not shown).

The processing unit CPU 20 comprises a microprocessor (not shown), memory 604 and possibly software. The software can be stored in the memory 21,22. The microprocessor controls, on the basis of the software, the operation of the terminal 5a, such as the receiving of the data stream, the tolerance of the impulse burst noise in the data reception, displaying output in the user interface and the reading of inputs received from the user interface. The operations are described above. The hardware contains circuitry for detecting the signal, circuitry for demodulation, circuitry for detecting the impulse, circuitry for blanking those samples of the symbol where significant amount of impulse noise is present, circuitry for calculating estimates, and circuitry for performing the corrections of the corrupted data.

Still referring to FIG. 7, alternatively, middleware or software implementation can be applied. The terminal 5a can be a hand-held device that the user can comfortably carry. Advantageously, the terminal 5a can be a cellular mobile phone which comprises the multi-carrier signal terminal part 15 for receiving the multicast transmission stream. Therefore, the terminal 5a may possibly interact with the service providers.

Ramifications and Scope

Although the description above contains many specifics, these are merely provided to illustrate the invention and should not be construed as limitations of the invention's scope. Thus it will be apparent to those skilled in the art that various modifications and variations can be made in the system and methods described herein without departing from the scope of the claimed invention.

The invention claimed is:

1. Data transmission method comprising:
    placing one or more data segments into a two-dimensional data structure having first directional arrangements and second directional arrangements,
    wherein said first directional arrangements are functionally perpendicular to said second directional arrangements, and wherein placement of said data segments is with respect to said first directional arrangements;
    adding to each of said second directional arrangements one or more corresponding computed characteristic values;
    transmitting contents of one or more of said first directional arrangements that holds portions of said characteristic values; and
    transmitting said one or more data segments,
    wherein data segments placed into said two-dimensional structure are transmitted according to a first specific format, and said first directional arrangements holding portions of said characteristic values are transmitted with a second specific format in a transport stream.

2. The method according to claim 1 wherein the transmitting according to the first specific format comprises encapsulating data segments placed into said two-dimensional structure into one or more data packets having a first header.

3. The method according to claim 1 wherein the transmitting with the second specific format comprises data encapsulated in the first directional arrangements that holds portions of said characteristic values into a data packet having a second header.

4. The method according to claim 3 wherein at least one of said first header and said second header includes data structure placement information.

5. The method according to claim 3 wherein at least one said first header and said second header includes data indicating data segment boundaries.

6. The method according to claim 3 wherein the data encapsulated in said first directional arrangements that holds portions of said characteristic values, are transmitted in a different burst from said encapsulated data segments.

7. The method according to claim 3 wherein the data segments comprise IP datagrams.

8. The method according to claim 7 wherein the header data is carried in byte positions reserved for a MAC address of the datagrams.

9. The method according to claim 7 including transmitting the IP datagrams in a same order in which they are loaded into the two-dimensional data structure.

10. The method according to claim 1 wherein the characteristic values are for forward error correction.

11. The method according to claim 1 wherein the characteristic values are Reed Solomon codes.

12. The method according to claim 1 wherein the first directional arrangements correspond to columns and the second directional arrangements correspond to rows of a data array.

13. The method according to claim 1 wherein the data segments comprise MPE sections, and data corresponding characteristic values are contained within MPE-FEC sections, said sections having respective headers.

14. The method according to claim 13 wherein the MPE sections comprise a table, and including filling unfilled locations in the table with padding data.

15. The method according to claim 14 including signaling the amount of filling of the table with padding data.

16. The method according to claim 15 including signaling in the header the number of columns of padding data in the table.

17. The method according to claim 14 wherein the filling of unfilled locations in the table with padding data includes filling one or more completely unfilled first directional arrangements with padding data.

18. The method according to claim 17 including signaling, in the header of each MPE-FEC section, the number of said one or more first directional arrangements completely filled with padding data.

19. The method according to claim 13 including transmitting said MPE sections and said MPE-FEC sections in a same elementary stream.

20. The method according to claim 13 wherein at least one of the headers contains a frame parameter corresponding to a frame comprising a plurality of said MPE and MPE-FEC sections.

21. The method according to claim 13 wherein at least one of the headers contains a table parameter corresponding to a table comprising a plurality of said MPE or MPE-FEC sections.

22. The method according to claim 21 wherein the parameter indicates the last of said sections that corresponds to the table.

23. The method according to claim 13 wherein data in the headers comprises real time parameters corresponding to configuration of the sections.

24. The method according to claim 23 wherein the real time parameters includes time slicing information.

25. The method according to claim 13 including protecting said MPE and MPE-FEC sections using cyclical redundancy code (CRC).

26. The method according to claim 1 including signaling number of second directional arrangements.

27. The method according to claim 26, wherein signaling the number of second directional arrangements comprises specifying data in a descriptor.

28. The method according to claim 1 including puncturing data corresponding to the characteristic values.

29. The method according to claim 28 wherein puncturing said data includes discarding at least one of said first directional arrangements holding portions of said characteristic values.

30. The method according to claim 29 including computing a number of discarded first directional arrangements holding portions of characteristic values in dependence upon a last data segment number.

31. The method according to claim 30 wherein the computing of said number of discarded first directional arrangements holding portions of characteristic values comprises determining a result of subtracting said last data segment number from a constant which is a positive integer.

32. The method according to claim 28 wherein a first amount of puncturing for a first set of data in said two-dimensional data structure differs from a second amount of puncturing for a second set of data in said two-dimensional data structure.

33. The method according to claim 32 including not signaling said second amount of puncturing.

34. Transmitter node configured to perform a method as claimed in claim 1.

35. Method of receiving data comprising:
receiving one or more data segments in a transport stream,
providing a two-dimensional data structure having first directional arrangements and second directional arrangements,
wherein said first directional arrangements are functionally perpendicular to said second directional arrangements, and wherein placement of said data segments is with respect to said first directional arrangements;
wherein data segments placed into said two-dimensional structure are received according to a first specific format
said first directional arrangements also receiving portions of characteristic values that are received with a second specific format in the transport stream, and
processing the data segments with respect to the second directional arrangements using the characteristic values to provide corrected data segments with respect to the first directional arrangements.

36. The method according to claim 35 wherein the characteristic values are for forward error correction.

37. The method according to claim 35 wherein the characteristic values are Reed Solomon codes.

38. The method according to claim 35 wherein the first directional arrangements correspond to columns and the second directional arrangements correspond to rows of a data array.

39. The method according to claim 35 wherein said data segments are encapsulated into data packets having data packet headers, wherein at least one of said data packet headers includes data structure placement information, and including using the structure placement information to control loading of the received characteristic values, the data segments, or both, into the two dimensional data structure.

40. The method according to claim 39 including inspecting data packet headers to obtain said data structure placement information.

41. The method according to claim 40 including placing said data, structure within a table according to said data structure placement information.

42. The method according to claim 35 wherein said data segments are encapsulated into data packets having data packet headers, wherein at least one of said data packet headers includes data segment boundary information indicating data segment boundaries and including using the data segment boundary information to control loading of the received characteristic values, the data segments, or both, into the two dimensional data structure.

43. The method according to claim 35 wherein the data segments comprise MPE sections, and data corresponding to characteristic values is contained within MPE-FEC sections, said sections having respective headers, and including using the data in the headers to control loading of the sections into the two dimensional array.

44. The method according to claim 43 including receiving said MPE sections and said MPE-FEC sections in a same elementary stream.

45. The method according to claim 43 wherein at least one of the headers contains data corresponding to a frame comprising a plurality of said MPE and MPE-FEC sections.

46. The method according to claim 43 wherein at least one of the headers contains data corresponding to a table comprising a plurality of said MPE or MPE-FEC sections.

47. The method according to claim 43 including receiving only some of said MPE-FEC sections.

48. The method according to claim 43 wherein said headers contain time slicing information and including controlling operation of a receiver node in accordance with the time slicing information.

49. The method according to claim 43 including introducing padding data into a table in dependence upon data in an MPE-FEC section header.

50. The method according to claim 49 including marking said padding data introduced into the table as being reliable.

51. The method according to claim 50 including introducing first directional arrangements to replace discarded first directional arrangements holding portions of characteristic data values in dependence upon a last data segment number.

52. The method according to claim 51 including marking said data introduced into the table as being unreliable.

53. Receiver node configured to operate according to the method as claimed in claim 35.

54. Data transmitter node comprising:
a processor operable to place one or more data segments into a two-dimensional data structure having first directional arrangements and second directional arrangements,
wherein said first directional arrangements are functionally perpendicular to said second directional arrangements, and wherein placement of said data segments is with respect to said first directional arrangements;
the processor being operable to add to each of said second directional arrangements one or more corresponding computed characteristic values; and
a transmitter configuration operable to transmit contents of one or more of said first directional arrangements that holds portions of said characteristic values, and said one or more data segments in a transport stream,
wherein data segments placed into said two-dimensional structure are transmitted according to a first specific format and said first directional arrangements holding portions of said characteristic values are transmitted with a second specific format in the transport stream.

55. The node according to claim 54 wherein the first specific format comprises data segments placed into said two-dimensional structure encapsulated into one or more data packets having a first header.

56. The node according to claim 55 wherein the second specific format comprises data in the first directional arrangements that hold portions of said characteristic values encapsulated into a data packet having a second header.

57. The node according to claim 56 wherein at least one of said first header and said second header includes data structure placement information.

58. The node according to claim 56 wherein at least one said first header and said second header includes data indicating data segment boundaries.

59. The node according to claim 54 wherein contents of one or more of said first directional arrangements holds portions of said characteristic values that are for transmission in a burst different from said data segments.

60. Receiver node for receiving data, comprising:
processing circuitry to receive one or more data segments in a transport stream, according to a first specific format, and portions of characteristic values according to a second specific format in the transport stream, and to provide a two-dimensional data structure having first directional arrangements and second directional arrangements, wherein said first directional arrangements are functionally perpendicular to said second directional arrangements, and wherein placement of said data segments and the characteristic values is with respect to said first directional arrangements;
the processing circuitry operable to process the data segments with respect to the second directional arrangements using the received characteristic values to provide corrected data segments with respect to the first directional arrangements.

61. The node according to claim 60 wherein the first specific format comprises data segments placed into said two-dimensional structure encapsulated into one or more data packets having a first header.

62. The node according to claim 61 wherein the second specific format comprises data in the first directional arrangements that hold portions of said characteristic values encapsulated into a data packet having a second header.

63. The node according to claim 62 wherein at least one of said first header and said second header includes information indicating data segment boundaries, and the processing circuitry is operable to use the data segment boundary information to control loading of the received characteristic values, data segments, or both, into the two dimensional data structure.

64. The node according to claim 62 wherein at least one of said first header and said second header includes data structure placement information, and the processing circuitry is operable to use the structure placement information to control loading of received characteristic values, data segments, or both, into the two dimensional data structure.

65. The node according to claim 60 wherein the first directional arrangements correspond to columns and the second directional arrangements correspond to rows of a data array.

66. The node according to claim 60 wherein the characteristic values are for forward error correction.

67. The node according to claim 60 wherein the characteristic values are Reed Solomon codes.

68. The receiver node according to claim 60 that comprises mobile telecommunications apparatus.

69. Data transmission apparatus comprising a processor operable to provide a data structure of rows and columns, to load IP datagrams into respective ones of the columns to form application data sections that collectively define an application data table, to create further columns of error correction data corresponding to rows of the application data sections, the error correction data defining an error correction table, with columns of the error correction table comprising error correction sections, and a transmitter for transmitting said sections.

* * * * *